United States Patent

Michals et al.

[15] 3,640,166
[45] Feb. 8, 1972

[54] MACHINE FOR CUTTING SLABS FROM ICE BLOCKS

[72] Inventors: Chester S. Michals, North Hyde Park, N.Y.; Philip J. Motroni, Fox Lake, Ill.

[73] Assignee: Air Reduction Company, Incorporated, New York, N.Y.

[22] Filed: Oct. 1, 1968

[21] Appl. No.: 764,134

[52] U.S. Cl. ................................83/201, 83/101, 83/411 A, 83/453, 125/21
[51] Int. Cl. ........................................................B26d 4/42
[58] Field of Search..................83/101, 165, 201, 403, 411, 83/411 A, 431, 453, 461; 143/38; 125/21

[56] References Cited

UNITED STATES PATENTS

| | | | |
|---|---|---|---|
| 1,605,383 | 11/1926 | Ashworth | 83/101 X |
| 2,193,979 | 3/1940 | Ott | 83/411 A UX |
| 2,297,149 | 9/1942 | Houck et al. | 83/411 A UX |
| 2,328,712 | 9/1943 | Domke | 83/411 X |
| 2,398,230 | 4/1946 | Keller | 83/411 |
| 2,617,454 | 11/1952 | Booth | 83/411 X |

Primary Examiner—Andrew R. Juhasz
Assistant Examiner—Leon Gilden
Attorney—Francis B. Henry, Edmund W. Bopp and H. Hume Mathews

[57] ABSTRACT

A rotatable table carries a plurality of open-bottomed holders for blocks of material to be cut, more specifically dry ice. Under the table is a sector plate of about 240° to 270° of arc and spaced from the bottom surface of the table by a vertical distance not greater than the smallest thickness of slab to be cut. Beyond one edge of the sector plate, is mounted an indexing platform the height of which can be adjusted according to the exact thickness of slab desired. Beyond the edge of the indexing plate and still within the open portion of the sector plate, is a horizontal bandsaw blade operable with a slight clearance space from the bottom of the table. The block to be cut slides upon the sector plate as the table rotates and drops onto the indexing platform. Means then are actuated to hold the block in suspension within the holder as the block approaches the saw blade. An even cut is made parallel to the bottom face of the block without danger of jamming or breaking the block. When the clamped upper portion of the block is carried over the sector plate again, the clamping means is released and the block falls to the sector plate in preparation for another cut. A chute is provided below the saw blade and a sweeper arm is actuated after every cut to remove any debris from the indexing platform.

5 Claims, 6 Drawing Figures

PATENTED FEB 8 1972

INVENTORS
PHILIP J. MOTRONI
CHESTER S. MICHALS

BY  *F B Henry*

ATTORNEY

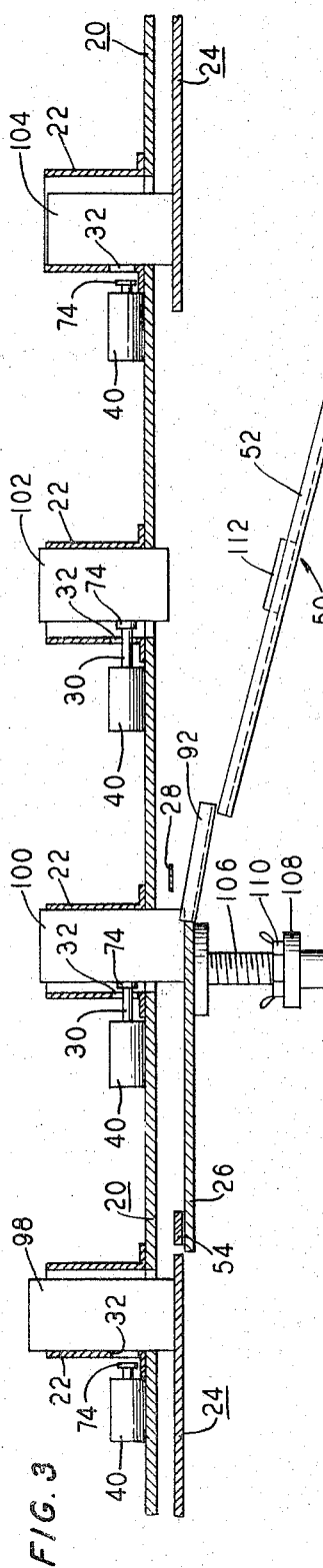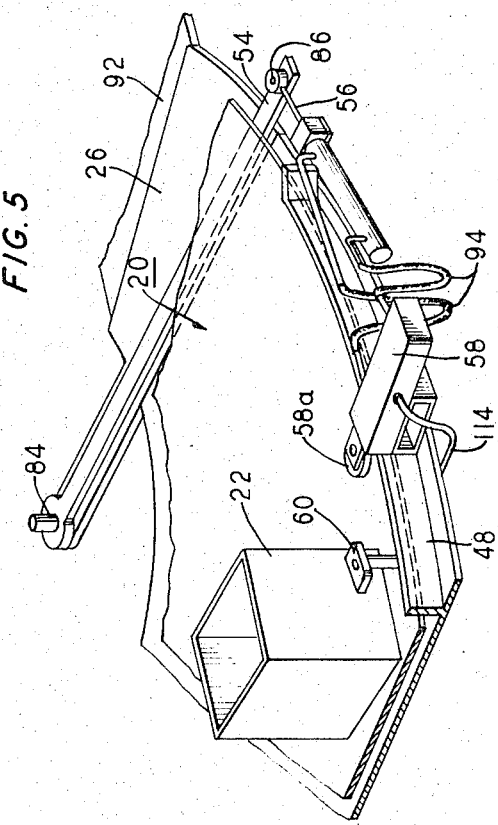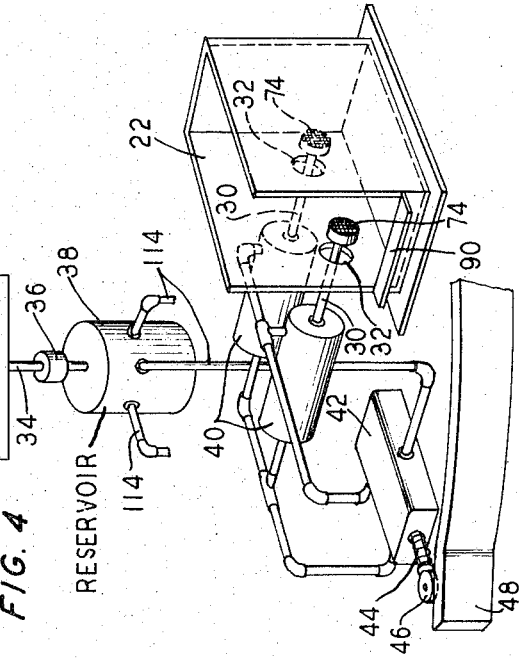

MACHINE FOR CUTTING SLABS FROM ICE BLOCKS

FIELD OF THE INVENTION

The invention relates to a semiautomatic device particularly for preparing slabs of solid carbon dioxide (dry ice), although the device can be used to cut other solid materials. The slabs are especially for use in airline food containers which generally have compartments which hold dry ice slabs which are 5 by 5 by 1 inches, for example. A number of these slabs are used for each container and are placed in the containers in the commissary where the food is prepared. The blocks or slabs will refrigerate the containers while the food is being transported to the aircraft and while the aircraft is airborne. The dry ice blocks are clean, contain high refrigerant capacity, sublime slowly and leave no residue. Thus there is no cleanup problem for stewardesses, etc. Furthermore, there is no need for a mechanical refrigerating system on the aircraft to keep food cool.

DESCRIPTION OF THE PRIOR ART

While the above-described use for dry ice slabs is well known, there has heretofore been no really economical way to produce slabs of this size in quantities sufficient to supply large airfields.

In the past, the large solid dry ice blocks (10 by 10 by 10 inches) were cut manually using bandsaw, into slabs which were 5 by 5 by 1 inches for sale to the airlines. This procedure has proven extremely burdensome, in that the ice is extremely heavy, hard to handle and the cuts that are made often produce undersize or oversize slabs. Slabs which are oversize will not fit into the trays in the food compartment and undersize slabs will not produce the desired refrigeration. An always present danger is the saw itself, which travels at high speed and could seriously injure a workman who has become careless after long hours on the job or who has slipped or fallen into the saw.

SUMMARY OF THE INVENTION

The present invention eliminates essentially all of the above drawbacks of the system previously used and results in an apparatus which can produce approximately 100 slabs of size 5 by 5 by 1 inches per minute.

One of the objects of the present invention is to provide a machine for making small slabs of dry ice or other material in an extremely efficient and economical way and with a high capacity.

Another object of the invention is to provide an apparatus which is sturdy in structure, reliable, and safe in operation.

Another object is to provide an apparatus which is relatively simple to use and which requires a minimum of manpower to run.

Another object is to provide an apparatus which is readily adapted to be moved from location to location to perform its function where needed.

Another object is to provide an apparatus which will produce dry ice slabs consistently of a predetermined size.

Still another object is to provide an apparatus which is designed to essentially eliminate the possibility of jamming.

With these and other objects in view, the invention comprises a cutting apparatus having a bandsaw and a rotatable table having holders which periodically bring blocks of material to be cut across said saw. Means are provided to insure uniform cuts of preselected thickness.

Other objects and advantages will be apparent from the detailed description when considered in conjunction with the accompanying drawing.

BRIEF DESCRIPTION OF THE DRAWING

FIG. 3 is a developed view, partial in section, of the indexing and cutting arrangements employed in the embodiment shown in FIGS. 1 and 2;

FIG. 4 is a fragmentary view, partly in perspective and partly diagrammatical, showing details of an arrangement for holding and releasing iceblocks upon the rotatable table;

FIG. 5 is a fragmentary view, mainly in perspective, showing an arrangement for sweeping debris from the indexing and cutting portion of the device.

DESCRIPTION OF THE PREFERRED EMBODIMENT

Figure 1:
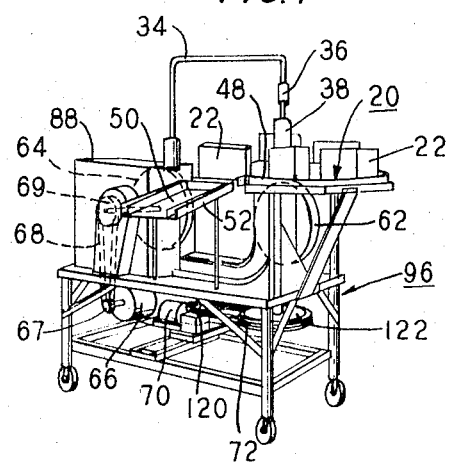
FIG. 1 is a general perspective view of a cutting machine embodying the invention.

Referring to the drawings, there is shown a rotatable table 20 upon which are mounted a plurality of bottomless holders or buckets 22. Each holder 22 is mounted over a hole in the table, the hole being of the same size and shape as the lowermost perimeter of the holder. Mounted directly below the table 20 is a stationary circular sector plate 24 of radius approximately the same as the radius of the table 20, the sector being illustrated as comprising approximately 240° of arc. The upper surface of the sector plate 24 is preferably of micarta, or other substance having the property of permitting free sliding of iceblocks thereon. The sector plate 24 is substantially parallel to the table 20 and is spaced below the table by a distance that approximates the least thickness desired for slices to be cut from iceblocks by the apparatus.

In the space below the table 20 and adjacent to one edge of the sector plate 24 there is provided an indexing platform 26 and a receiving tray 92 occupying together about 60° of arc. The platform and tray are supported independently of both the table 20 and the sector plate 24, and are adjustable as to height. Supported above the tray 92 with a slight clearance below the bottom surface of the table 20 is a bandsaw blade 28 movable in a horizontal plane. The distance from the upper surface of the platform 26 to the lower level of the kerf of the saw blade 28 can be adjusted to give the desired thickness of slice to be cut from the iceblock by the blade 28.

The general mode of operation of the illustrated apparatus is best seen in FIG. 3. An iceblock 98 of proper size to fit easily into the holder 22 is put into the holder from above at a time when the holder 22 is directly above some portion of the sector plate 24 and the iceblock drops onto the sector plate 24 and slides on the surface of plate 24 as the table 20 turns. When the holder 22 is advanced beyond the edge of sector plate 24, the iceblock falls further to rest upon the upper surface of the indexing platform 26 as shown by block 100. At a point in the operation before the block 100 strikes the sawblade 28, means are actuated to clamp the iceblock in the holder 22, the clamping being effective upon the portion of the iceblock above the table 20. The iceblock, clamped against falling, is advanced against the sawblade 28, producing a slice 112 of predetermined thickness which is not supported after is leaves the indexing platform 26 and which drops onto the downwardly sloping tray 92 attached to or integral with the indexing platform 26 and thence into an output chute 50 along which the slice slides, for example to suitable packaging equipment. The upper portion 102 of an iceblock from which a slice has been cut continues in clamped position until the table brings the block again over the sector plate 24, when the clamping means may be released, allowing the block 50 drop to the sector plate 24 ready for another slicing operation as illustrated by a block 104. It is most important that the indexing platform terminate before it reaches the area of the sawblade 28. The slice being cut should not be supported from underneath in that this leads to jamming and twisting of the blade. The slice should be free to drop vertically a small distance at the end of the cut without any hindrance.

The means for clamping and releasing the iceblock in the holder 22 is illustrated in FIG. 4 in the form of two pneumatic rams 30 mounted upon the table 20 adjacent the respective holder 22. The rams 30 extend through holes 32 in the wall of the holder 22 where they can be pressed against the side of the iceblock to effect clamping as needed. The ram 30 is double-acting so that it can be actuated to press against the iceblock or positively moved back to release the pressure and allow the iceblock to fall. Compressed air or other pneumatic medium is brought to the table 20 from any suitable source, either from a compressor 88 within the apparatus shown or from an outside location through a supply tube 34 at the center of rotation of the table 20 and through a rotatable coupling 36 into a reservoir 38. From the reservoir 38, distributing tubes 114 run to the individual ram locations. Each ram 30 has the usual cylinder 40 and piston with means to admit pneumatic pressure at either end of the cylinder.

The rams 30 operative upon a particular holder 22 are actuated in unison by admitting compressed air into one end of the cylinder 40 to advance the ram or into the other end of the cylinder to retract the ram. The air is directed into either end of the cylinder 40 through a valve 42. The valve 42 is illustrated as a slide valve actuable by means of a spring-loaded slider 44 preferably provided with a roller contactor 46. The spring maintains the valve 42 in the position in which the rams 30 are retracted. Adjacent to the circumference of the table 20 there is mounted upon the frame of the machine a cam segment 48 which contacts roller 46 during a part of its rotation. The segment 48 is substantially coextensive with the sector plate 24, so that any given pair of rams 30 are in the retracted position at all times while the holder 22 to which the pair are connected is over the sector plate 24, and the rams are pressed toward the iceblock at all times while the holder 22 is over the open portion of the sector plate 24.

The chute 50 is preferably straight, with parallel sides 52 spaced apart by a distance approximately equal to the length of a slice, so that the slices are guided in their descent and are prevented from rotating or jamming. The high end of the chute 50 is located below the sloping tray 92 and the direction of the chute is perpendicular to the line of the saw blade 28. The chute 50 is preferably spring loaded to cushion the shock of the cut slabs falling upon it. The chute is also adjustably mounted so that it can be moved vertically to the desired position.

To clear the indexing platform 26 of broken pieces of ice or other debris that may fall there, a sweeper arm 54 (FIG. 5) is pivoted at 84 to the frame of the indexing table so that it can be moved with said table 20. The length of the arm is preferably approximately equal to the radius of the table 20. The end of the arm 54 nearer the circumference of the table 20 is pivoted at 86 to the piston rod of a pneumatic ram 56. The ram 56 is similar to the ram 30 but with a longer stroke and is actuated by a slide valve 58 attached to the cam segment 48 in position to be struck successively by a plurality of cams 60 mounted in any convenient manner upon the table 20, for example, one beside each holder 22 in such position as to actuate the ram 56 at the instant when the holder 22 ahead of the holder that is actuating the cam has just cleared the indexing platform 26. The flexible tubing 94 allows the ram to be adjusted vertically with respect to the long-way spring-loaded slide valve 58.

The pushing stroke of the ram 56 moves the sweeper arm 54 across the indexing platform in the direction toward the chute 50 to sweep the debris onto the chute. The retracting stroke returns the sweeper arm to the starting position for the next pushing stroke. It is preferable that the pushing stroke be relatively slow to effect good cleaning and the retracting stroke relatively swift. To accomplish this, a restricted orifice can be inserted in the pneumatic feed line to the end of the cylinder which actuates the pushing stroke. By providing one cam 60 for each holder 22, the sweeper arm 54 sweeps the indexing platform clear after each slicing operation of the saw blade 28.

After a cam 60 passes the cam follower 58a, the spring return in the slide valve 58 returns follower 58a to its normal extended position and also returns the ram 56 to its retracted position.

The saw blade 28 is preferably the blade of a bandsaw, passing around two supporting wheels 62 and 64 (FIG. 1) mounted in a vertical plane and supported on the frame of the machine. The bandsaw may be driven by a motor 66 through sprockets 67 and 69, and chain drive 68.

The table 20 is preferably driven by a separate motor 70 supported on the frame of the machine and connected to the table by a belt 72 upon pulleys 120 and 122, in order that slippage of the belt occurs when necessary to protect the saw.

The saw motor 66 and the table motor 70 should be interlocked electrically for the further protection of the sawblade 28 so that the saw must be running when the table starts rotating.

The outer end of the piston rod of the ram 40 which is intended to grip the iceblock and hold it securely in the holder 22 during the slicing operation is preferably provided with a micarta disk 74 serrated on the side toward the iceblock.

Sawblade holders 76 and 78 are provided near each end of the iceblock to be sliced. The holder 76 is supported on the frame of the machine ahead of the cutting region of the saw, near the center of rotation of the table 20. This holder is equipped with two sets of rollers. One set 80 runs on horizontal axes and presses upon the sawblade 28 above and below to hold the blade horizontal. The set 82 runs on vertical axes and opposes horizontal deflection of the sawblade 28 under pressure from the iceblock being sliced. The sawblade 28 is driven in the direction from the blade holder 76 away from the center of rotation of the table 20 toward the holder 78. The holder 78 is preferably made of wood and so shaped as to hold the sawblade in horizontal position and at the same time resist deflection of the sawblade by the block being cut. The use of wood for the holder 78 tends to avoid accumulation of ice particles carried to the holder 78 by the sawblade, which particles are likely to freeze to a metal holder.

Figure 6:
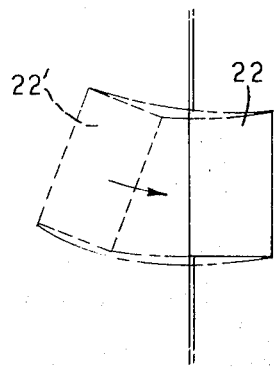
FIG. 6 is a diagram used to explain the angular relationship desired between the line of the sawblade and the trailing edge of an iceblock to be cut.
Figure 2:
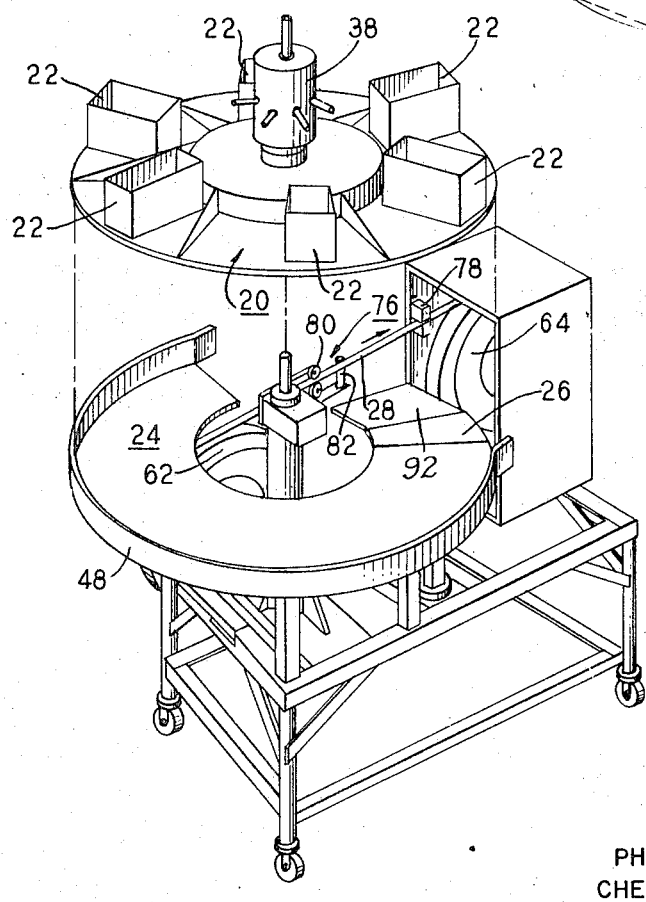
FIG. 2 is an exploded view in perspective showing a rotatable table and supporting parts thereunder.

The block holder 22 is preferably so oriented upon the table 20 that the trailing edge of the iceblock leaves the sawblade closely parallel to the sawblade as shown diagrammatically in FIG. 6. In this way, breakage of the block by the sawblade ending a cut across one corner of the block is substantially prevented. With the trailing edge so aligned, it is evident that the block will first strike the sawblade at a leading corner. Danger of breaking a corner from the block when the blade enters is slight, in fact, a cut is more readily started at a corner than along an entire side of the block.

For ease of loading, the holder 22 may have three sides instead of four. The narrow side nearer the outer edge of the table 20 may be reduced to a low sill 90 or lip as shown in FIG. 4. The iceblock can be readily slid into place over the sill 90, which latter will keep the black from sliding out of the open side of the holder.

The number of holders 22 may be increased or decreased as desired. In any case, the arc of the sector plate 24 should be about the proportion of the complete circle occupied by two less than the total number of holders 22, leaving two spaces to accommodate the indexing platform 26, tray 92 and the cutting position. The circumference of the table 20, sector plate 24, and cam segment 48 should be selected of such size as to accommodate satisfactorily the desired number of holders 22.

A machine that has been built and successfully operated is equipped with six holders for dry ice blocks 10 by 10 by 5 inches. It is mounted upon a carriage 96 or wheeled table about 5 feet by 2½ feet and about 40 inches tall. The rotatable table 20 has a radius of about 20 inches. The sector plate 24 also has a radius of about 20 inches and a radial width of about 12 inches.

The motor 66 driving the saw is 1½ horsepower, 440 volts. The bandsaw has a ¾-inch blade passing over pulleys 20 inches in diameter. The motor 70 for rotating the table 20 is ⅓ horsepower, with double belt drive from a 4½-inch diameter pulley at the motor to a 16-inch diameter pulley at the table, thereby driving the table at about 8½ revolutions per minute.

The holders 22 are about 5¼ by 10¼ inches inside measurement.

The table 20, sector plate 24, and cam segment 48 are made of steel plate about ¼ inch thick.

The pneumatic tubing is standard ¼-inch, operated at about 60 pounds per square inch, although pressures from about 40 to 90 pounds may be used.

The pneumatic cylinders controlling the rams 30 and 56 have diameters about 1 ½inch. The rams 30 for the holders have 2-inch strokes, and the ram 56 for the sweeper arm 54 has a stroke of 10 inches.

The sweeper arm 54 is a ¼-inch-square bar about as long as the radius of the table 20.

The machine was particularly designed to receive blocks of dry ice 10 by 10 by 5 inches in size and to make slices 10 by 5 by 1 inch, or 5 by 5 by 1 inch. When slices 5 by 5 by 1 inch are wanted, the 10 by 10 by 5 inch block may be cut into two blocks each 10 by 5 by 5 inches and these two may be placed in the holder 22 side by side, occupying the same space as the uncut 10 by 10 by 5 inch block. The two rams 30 are so spaced that one ram will grip each half-block, holding the two as if they were a single block. The saw then cuts the two blocks in the same manner as a single block and two 5 by 5 by 1 inch slices fall onto the chute 50 side by side and slide down together.

While illustrative forms of apparatus and methods in accordance with the invention have been described and shown herein, it will be understood that numerous changes may be made without departing from the general principles and scope of the invention.

What is claimed is:

1. A cutting apparatus for cutting portions of predetermined thickness from blocks of material having polygonal cross sections comprising, in combination, a rotatable table, means to rotate said table, a plurality of block holder means on said table adapted to accept blocks of material to be cut, each of said block holder means having at least one substantially planar surface and a material-locking means for engaging the block of material to be cut and for rigidly pressing it against the said surface in the holder means, bandsaw means having an endless blade with a straight course positioned adjacent said table, blade holder means mounted on said cutting apparatus and positioned to resist deflection of said endless blade during a cutting operation, indexing means to advance the material to be cut from the holder means a predetermined amount so that it may be cut by the straight course of the bandsaw means and to actuate the material-locking means so that the material is firmly held in the block holder means against the said surface as it is cut by the bandsaw means, the portion of the block cut being essentially unsupported so that it is free to drop away from the bandsaw means at the end of the cut each block holder means having its said at least one planar surface positioned to pass over the straight course and oriented on said table so that a corner of a block of material initially contacts the straight course thereby facilitating the starting cut and so that the trailing edge of the block is substantially parallel to the straight course of the bandsaw blade as the trailing edge passes over said blade.

2. The apparatus defined in claim 1, in which the material-locking means comprises at least one plunger which is adapted to contact the block of material to be cut.

3. The apparatus defined in claim 1, in which the indexing means comprises a platform adjustable as to height located adjacent to and at a level below said saw means to receive and support material to be cut as it is advanced from the holder means so that the depth of cut may be determined by the height of the platform, and so that the material-locking means may be actuated to secure the material to be cut before said material contacts the saw means.

4. The apparatus defined in claim 3, together with a sector plate located below said table and parallel thereto at a height above said platform to support an initial advance of the material to be cut before said material is advanced to cutting position by being lowered to said platform.

5. The apparatus defined in claim 1, in which the material to be cut is solid carbon dioxide blocks having a rectangular cross section.

* * * * *